(12) United States Patent
Ma et al.

(10) Patent No.: US 7,544,745 B2
(45) Date of Patent: Jun. 9, 2009

(54) FLAME RETARDANT THERMOPLASTIC POLYCARBONATE COMPOSITIONS, METHOD OF MANUFACTURE, AND METHOD OF USE THEREOF

(75) Inventors: Shiping Ma, Tochigi-ken (JP); Srinivas Siripurapu, Evansville, IN (US); Pei Sun, Shanghai (CN); Wayne Yao, Shanghai (CN)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 647 days.

(21) Appl. No.: 11/258,412

(22) Filed: Oct. 25, 2005

(65) Prior Publication Data

US 2007/0093591 A1 Apr. 26, 2007

(51) Int. Cl.
*C08L 69/00* (2006.01)
(52) U.S. Cl. .............. 525/196; 525/233; 525/234; 525/237; 525/241; 528/196; 524/115
(58) Field of Classification Search .............. 525/196, 525/233, 234, 237, 241; 528/196; 524/115
See application file for complete search history.

(56) References Cited

U.S. PATENT DOCUMENTS

| | | | |
|---|---|---|---|
| 3,130,177 A | 4/1964 | Grabowski | |
| 3,511,895 A | 5/1970 | Kyonieus et al. | |
| 3,981,944 A | 9/1976 | Okamoto et al. | |
| 4,154,775 A | 5/1979 | Axelrod | |
| 4,756,701 A | 7/1988 | Danko et al. | |
| 5,380,795 A | 1/1995 | Gosens et al. | |
| 5,414,045 A | 5/1995 | Sue et al. | |
| 5,488,086 A | 1/1996 | Umeda et al. | |
| 6,403,683 B1 * | 6/2002 | Kobayashi | 524/115 |
| 6,545,089 B1 | 4/2003 | DeRudder et al. | |
| 2003/0092837 A1 | 5/2003 | Eichenauer | |
| 2003/0105226 A1 | 6/2003 | Cella et al. | |
| 2003/0119986 A1 | 6/2003 | Eichenauer | |
| 2004/0143045 A1 * | 7/2004 | Morgan et al. | 524/115 |

FOREIGN PATENT DOCUMENTS

| | | |
|---|---|---|
| EP | 0692522 B1 | 9/2002 |
| GB | 2043083 A | 3/1979 |

* cited by examiner

*Primary Examiner*—Kelechi C Egwim

(57) ABSTRACT

A flame retardant thermoplastic composition comprising in combination a polycarbonate component; an impact modifier composition, the components of the impact modifier composition comprising a) a bulk polymerized ABS, and b) an impact modifier different from the ABS; and a flame retardant. The compositions have an improved balance of physical properties such as impact strength and flow, while at the same time maintaining their good flame performance.

22 Claims, No Drawings

FLAME RETARDANT THERMOPLASTIC POLYCARBONATE COMPOSITIONS, METHOD OF MANUFACTURE, AND METHOD OF USE THEREOF

BACKGROUND

This invention is directed to flame retardant thermoplastic compositions comprising aromatic polycarbonate, their method of manufacture, and method of use thereof, and in particular impact-modified thermoplastic polycarbonate compositions having improved mechanical properties.

Polycarbonates are useful in the manufacture of articles and components for a wide range of applications, from automotive parts to electronic appliances. Because of their broad use, particularly in electronic applications, it is desirable to provide polycarbonates with flame retardancy. Many known flame retardant agents used with polycarbonates contain bromine and/or chlorine. Brominated and/or chlorinated flame retardant agents are less desirable because impurities and/or by-products arising from these agents can corrode the equipment associated with manufacture and use of the polycarbonates. Brominated and/or chlorinated flame retardant agents are also increasingly subject to regulatory restriction.

Nonhalogenated flame retardants have been proposed for polycarbonates, including various fillers, phosphorus-containing compounds, and certain salts. It has been difficult to meet the strictest standards of flame retardancy using the foregoing flame retardants, however, without also using brominated and/or chlorinated flame retardants, particularly in thin samples.

Polysiloxane-polycarbonate copolymers have also been proposed for use as non-brominated and non-chlorinated flame retardants. For example, U.S. Application Publication No. 2003/0105226 to Cella discloses a polysiloxane-modified polycarbonate comprising polysiloxane units and polycarbonate units, wherein the polysiloxane segments comprise 1 to 20 polysiloxane units. Use of other polysiloxane-modified polycarbonates are described in U.S. Pat. No. 5,380,795 to Gosen, U.S. Pat. No. 4,756,701 to Kress et al., U.S. Pat. No. 5,488,086 to Umeda et al., and EP 0 692 522B1 to Nodera, et al., for example.

While the foregoing flame retardants are suitable for their intended purposes, there nonetheless remains a continuing desire in the industry for continued improvement in flame performance. One need is for articles that are not as prone to burn-through, that is, the formation of holes upon the application of a flame. Thin articles in particular present a challenge, since burn-through holes tend to form more quickly. Non-brominated and/or non-chlorinated flame retardants can also adversely affect desirable physical properties of the polycarbonate compositions, particularly impact strength.

Aromatic polycarbonates are useful in the manufacture of articles and components for a wide range of applications, from automotive parts to electronic appliances. Impact modifiers are commonly added to aromatic polycarbonates to improve the toughness of the compositions. The impact modifiers often have a relatively rigid thermoplastic phase and an elastomeric (rubbery) phase, and may be formed by bulk or emulsion polymerization. Polycarbonate compositions comprising acrylonitrile-butadiene-styrene (ABS) impact modifiers are described generally, for example, in U.S. Pat. No. 3,130,177 and U.S. Pat. No. 3,130,177. Polycarbonate compositions comprising emulsion polymerized ABS impact modifiers are described in particular in U.S. Publication No. 2003/0119986. U.S. Publication No. 2003/0092837 discloses use of a combination of a bulk polymerized ABS and an emulsion polymerized ABS.

Of course, a wide variety of other types of impact modifiers for use in polycarbonate compositions have also been described. While suitable for their intended purpose of improving toughness, many impact modifiers may also adversely affect other properties, such as processability, hydrolytic stability, flame performance, and/or low temperature impact strength, particularly upon prolonged exposure to high humidity and/or high temperature such as may be found in Southeast Asia. Thermal aging stability of polycarbonate compositions, in particular, is often degraded with the addition of rubbery impact modifiers. There remains a continuing need in the art, therefore, for impact-modified thermoplastic polycarbonate compositions having a combination of good physical properties, including impact strength, flow and flame performance. It would also be advantageous if improved flame performance could be achieved without substantial degradation of properties such as impact strength

SUMMARY OF THE INVENTION

In one embodiment, a thermoplastic composition comprises in combination a polycarbonate component; an impact modifier composition, the components comprising a) a bulk polymerized ABS; and b) an impact modifier different from the ABS; and a flame retardant.

In another embodiment, an article comprises the above thermoplastic composition.

In still another embodiment, a method of manufacture of an article comprises molding, extruding, or shaping the above thermoplastic composition.

In still another embodiment, a method for the manufacture of a thermoplastic composition having improved impact strength and flame performance, the method comprising admixture of a polycarbonate, an impact modifier composition, the components of the impact modifier composition comprising a) a bulk polymerized ABS, and b) an impact modifier different from the ABS, and a flame retardant.

DETAILED DESCRIPTION OF THE INVENTION

It has been discovered by the inventors hereof that use of a combination of specific impact modifiers provides greatly improved balance of physical properties such as impact strength and flow to thermoplastic compositions containing polycarbonate, while at the same time maintaining their good flame performance. The improvement in physical properties without significantly adversely affecting flame performance is particularly unexpected, especially with the higher levels of butadiene in the compositions, as the flame performance and physical properties of similar compositions can be significantly worse. It has further been discovered that an advantageous combination of other physical properties, in addition to good impact strength, can be obtained by use of the specific combination of impact modifiers and flame retardant.

As used herein, the terms "polycarbonate" and "polycarbonate resin" means compositions having repeating structural carbonate units of formula (1):

in which at least about 60 percent of the total number of $R^1$ groups are aromatic organic radicals and the balance thereof are aliphatic, alicyclic, or aromatic radicals. In one embodiment each $R^1$ is an aromatic organic radical and, more specifically, a radical of formula (2):

$$-A^1-Y^1-A^2- \qquad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, which includes dihydroxy compounds of formula (3)

$$HO-A^1-Y^1-A^2-OH \qquad (3)$$

wherein $Y^1$, $A^1$ and $A^2$ are as described above. Also included are bisphenol compounds of general formula (4):

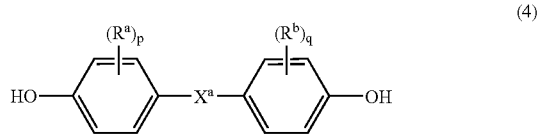

(4)

wherein $R^a$ and $R^b$ each represent a halogen atom or a monovalent hydrocarbon group and may be the same or different; p and q are each independently integers of 0 to 4; and $X^a$ represents one of the groups of formula (5):

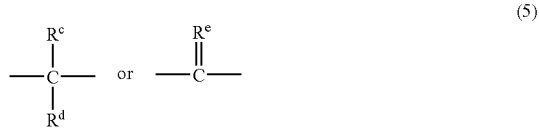

(5)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2, 3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2, 2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like. Combinations comprising at least one of the foregoing dihydroxy compounds may also be used.

A nonexclusive list of specific examples of the types of bisphenol compounds that may be represented by formula (3) includes 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis (4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane. Combinations comprising at least one of the foregoing bisphenol compounds may also be used.

Branched polycarbonates are also useful, as well as blends comprising a linear polycarbonate and a branched polycarbonate. The branched polycarbonates may be prepared by adding a branching agent during polymerization, for example a polyfunctional organic compound containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxyphenylethane, isatin-bis-phenol, tris-phenol TC (1,3,5-tris ((p-hydroxyphenyl)isopropyl)benzene), tris-phenol PA (4(4 (1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents may be added at a level of about 0.05-2.0 wt. %. All types of polycarbonate end groups are contemplated as being useful in the polycarbonate composition, provided that such end groups do not significantly affect desired properties of the thermoplastic compositions.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, and the. like) or a glycol (e.g., the bishaloformate of ethylene glycol, neopentyl glycol, polyethylene glycol, and the like). Combinations comprising at least one of the foregoing types of carbonate precursors may also be used.

Among the exemplary phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-188}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$ wherein X is Cl⁻, Br⁻, a $C_{1-8}$ alkoxy group or $C_{6-188}$ aryloxy group. An effective amount of a phase transfer catalyst may be about 0.1 to about 10 wt. % based on the weight of bisphenol in the phosgenation mixture. In another embodiment an effective amount of phase transfer catalyst may be about 0.5 to about 2 wt. % based on the weight of bisphenol in the phosgenation mixture.

Alternatively, melt processes may be used. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst. Volatile monohydric phenol is removed from the molten reactants by distillation and the polymer is isolated as a molten residue.

In one specific embodiment, the polycarbonate is a linear homopolymer derived from bisphenol A, in which each of $A^1$ and $A^2$ is p-phenylene and $Y^1$ is isopropylidene. The polycarbonates may have an intrinsic viscosity, as determined in chloroform at 25° C., of about 0.3 to about 1.5 deciliters per gram (dl/gm), specifically about 0.45 to about 1.0 dl/gm. The polycarbonates may have a weight average molecular weight of about 10,000 to about 200,000, specifically about 20,000 to about 100,000 as measured by gel permeation chromatography. The polycarbonates are substantially free of impurities, residual acids, residual bases, and/or residual metals that may catalyze the hydrolysis of polycarbonate.

"Polycarbonate" and "polycarbonate resin" as used herein further includes copolymers comprising carbonate chain units together with a different type of chain unit. Such copolymers may be random copolymers, block copolymers, dendrimers and the like. One specific type of copolymer that may be used is a polyester carbonate, also known as a copolyester-polycarbonate. Such copolymers further contain, in addition to recurring carbonate chain units of the formula (1), repeating units of formula (6)

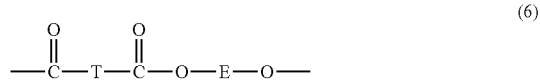

(6)

wherein E is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, E is a $C_{2-6}$ alkylene radical. In another embodiment, E is derived from an aromatic dihydroxy compound of formula (7):

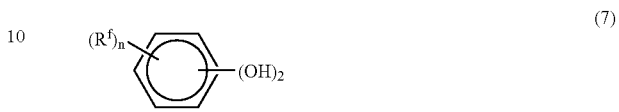

(7)

wherein each $R^f$ is independently a halogen atom, a $C_{1-10}$ hydrocarbon group, or a $C_{1-10}$ halogen substituted hydrocarbon group, and n is 0 to 4. The halogen is preferably bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluororesorcinol, 2,4,5,6-tetrabromo resorcinol, and the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluorohydroquinone, 2,3,5,6-tetrabromo hydroquinone, and the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific embodiment, E is a $C_{2-6}$ alkylene radical and T is p-phenylene, m-phenylene, naphthalene, a divalent cycloaliphatic radical, or a mixture thereof. This class of polyester includes the poly(alkylene terephthalates).

The copolyester-polycarbonate resins are also prepared by interfacial polymerization. Rather than using the dicarboxylic acid per se, it is possible, and sometimes even preferred, to employ the reactive derivatives of the acid, such as the corresponding acid halides, in particular the acid dichlorides and the acid dibromides. Thus, for example instead of using, isophthalic acid, terephthalic acid, and mixtures thereof, it is possible to employ isophthaloyl dichloride, terephthaloyl dichloride, and mixtures thereof. The copolyester-polycarbonate resins may have an intrinsic viscosity, as determined in chloroform at 25° C., of about 0.3 to about 1.5 deciliters per gram (dl/gm), specifically about 0.45 to about 1.0 dl/gm. The copolyester-polycarbonate resins may have a weight average molecular weight of about 10,000 to about 200,000, specifically about 20,000 to about 100,000 as measured by gel permeation chromatography. The copolyester-polycarbonate resins are substantially free of impurities, residual acids, residual bases, and/or residual metals that may catalyze the hydrolysis of polycarbonate.

The polycarbonate component may further comprise, in addition to the polycarbonates described above, combinations of the polycarbonates with other thermoplastic polymers, for example combinations of polycarbonate homopolymers and/or copolymers with polyesters and the like. As used herein, a "combination" is inclusive of all mixtures, blends, alloys, and the like. Suitable polyesters comprise repeating units of formula (6), and may be, for example, poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end-use of the composition.

In one embodiment, poly(alkylene terephthalates) are used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated herein are the above polyesters with a minor amount, e.g., from about 0.5 to about 10 percent by weight, of units derived from an aliphatic diacid and/or an aliphatic polyol to make copolyesters.

The blends of a polycarbonate and a polyester may comprise about 10 to about 99 wt. % polycarbonate and correspondingly about 1 to about 90 wt. % polyester, in particular a poly(alkylene terephthalate). In one embodiment, the blend comprises about 30 to about 70 wt. % polycarbonate and correspondingly about 30 to about 70 wt. % polyester. The foregoing amounts are based on the combined weight of the polycarbonate and polyester.

Although blends of polycarbonates with other polymers are contemplated, in one embodiment the polycarbonate component consists essentially of polycarbonate, i.e., the polycarbonate component comprises polycarbonate homopolymers and/or polycarbonate copolymers, and no other resins that would significantly adversely impact the impact strength of the thermoplastic composition. In another embodiment, the polycarbonate component consists of polycarbonate, i.e., is composed of only polycarbonate homopolymers and/or polycarbonate copolymers.

The thermoplastic composition further includes an impact modifier composition. It has been found by the inventors hereof that an effective impact modifier composition accordingly comprises a) a bulk polymerized ABS together with b) one or more additional impact modifiers different from the bulk polymerized ABS. In an embodiment, component b) comprises from about 10 wt. % to about 70 wt. % of the total impact modifier composition, specifically from about 10 wt. % to about 50 wt. % of the total impact modifier composition. In another embodiment, component b) comprises from about 14 wt. % to about 50 wt. % of the total impact modifier composition, specifically from about 14 wt. % to about 30 wt. % of the total impact modifier composition. Use of such an impact modifier composition, along with an appropriate flame retardant, can provide thermoplastic compositions having excellent physical properties and flame performance.

The bulk polymerized ABS comprises an elastomeric phase comprising (i) butadiene and having a Tg of less than about 10° C., and (ii) a rigid polymeric phase having a Tg of greater than about 15° C. and comprising a copolymer of a monovinylaromatic monomer such as styrene and an unsaturated nitrile such as acrylonitrile. Such ABS polymers may be prepared by first providing the elastomeric polymer, then polymerizing the constituent monomers of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Polybutadiene homopolymer may be used as the elastomer phase. Alternatively, the elastomer phase of the bulk polymerized ABS comprises butadiene copolymerized with up to about 25 wt. % of another conjugated diene monomer of formula (8):

wherein each $X^b$ is independently $C_1$-$C_5$ alkyl. Examples of conjugated diene monomers that may be used are isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. A specific conjugated diene is isoprene.

The elastomeric butadiene phase may additionally be copolymerized with up to 25 wt %, specifically up to about 15 wt. %, of another comonomer, for example monovinylaromatic monomers containing condensed aromatic ring structures such as vinyl naphthalene, vinyl anthracene and the like, or monomers of formula (9):

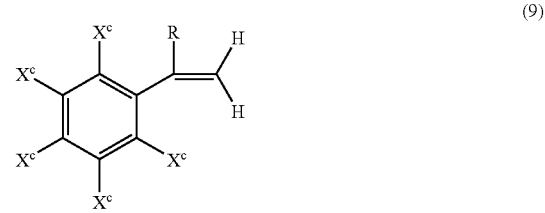

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers copolymerizable with the butadiene include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations comprising at least one of the foregoing monovinylaromatic monomers. In one embodiment, the butadiene is copolymerized with up to about 12 wt. %, specifically about 1 to about 10 wt. % styrene and/or alpha-methyl styrene.

Other monomers that may be copolymerized with the butadiene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (10):

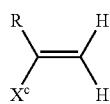

(10)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, and the like. Examples of monomers of formula (10) include acrylonitrile, ethacrylonitrile, methacrylonitrile, alpha-chloroacrylonitrile, beta-chloroacrylonitrile, alpha-bromoacrylonitrile, acrylic acid, methyl (meth) acrylate, ethyl (meth)acrylate, n-butyl (meth)acrylate, t-butyl (meth)acrylate, n-propyl (meth)acrylate, isopropyl (meth) acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the butadiene.

The particle size of the butadiene phase is not critical, and may be, for example about 0.01 to about 20 micrometers, specifically about 0.5 to about 10 micrometers, more specifically about 0.6 to about 1.5 micrometers may be used for bulk polymerized rubber substrates. Particle size may be measured by light transmission methods or capillary hydrodynamic chromatography (CHDF). The butadiene phase may provide about 5 to about 95 wt. % of the total weight of the ABS impact modifier copolymer, more specifically about 20 to about 90 wt. %, and even more specifically about 40 to about 85 wt. % of the ABS impact modifier, the remainder being the rigid graft phase.

The rigid graft phase comprises a copolymer formed from a styrenic monomer composition together with an unsaturated monomer comprising a nitrile group. As used herein, "styrenic monomer" includes monomers of formula (9) wherein each $X^c$ is independently hydrogen, $C_1$-$C_4$ alkyl, phenyl, $C_7$-$C_9$ aralkyl, $C_7$-$C_9$ alkaryl, $C_1$-$C_4$ alkoxy, phenoxy, chloro, bromo, or hydroxy, and R is hydrogen, $C_1$-$C_2$ alkyl, bromo, or chloro. Specific examples styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like. Combinations comprising at least one of the foregoing styrenic monomers may be used.

Further as used herein, an unsaturated monomer comprising a nitrile group includes monomers of formula (10) wherein R is hydrogen, $C_1$-$C_5$ alkyl, bromo, or chloro, and $X^c$ is cyano. Specific examples include acrylonitrile, ethacrylonitrile, methacrylonitrile, alpha-chloroacrylonitrile, beta-chloroacrylonitrile, alpha-bromoacrylonitrile, and the like. Combinations comprising at least one of the foregoing monomers may be used.

The rigid graft phase of the bulk polymerized ABS may further optionally comprise other monomers copolymerizable therewith, including other monovinylaromatic monomers and/or monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (10). Specific comonomers inlcude $C_1$-$C_4$ alkyl (meth)acrylates, for example methyl methacrylate.

The rigid copolymer phase will generally comprise about 10 to about 99 wt. %, specifically about 40 to about 95 wt. %, more specifically about 50 to about 90 wt. % of the styrenic monomer; about 1 to about 90 wt. %, specifically about 10 to about 80 wt. %, more specifically about 10 to about 50 wt. % of the unsaturated monomer comprising a nitrile group; and 0 to about 25 wt. %, specifically 1 to about 15 wt. % of other comonomer, each based on the total weight of the rigid copolymer phase.

The bulk polymerized ABS copolymer may further comprise a separate matrix or continuous phase of ungrafted rigid copolymer that may be simultaneously obtained with the ABS. The ABS may comprise about 40 to about 95 wt. % elastomer-modified graft copolymer and about 5 to about 65 wt. % rigid copolymer, based on the total weight of the ABS. In another embodiment, the ABS may comprise about 50 to about 85 wt. %, more specifically about 75 to about 85 wt. % elastomer-modified graft copolymer, together with about 15 to about 50 wt. %, more specifically about 15 to about 25 wt. % rigid copolymer, based on the total weight of the ABS.

A variety of bulk polymerization methods for ABS-type resins are known. In multizone plug flow bulk processes, a series of polymerization vessels (or towers), consecutively connected to each other, providing multiple reaction zones. The elastomeric butadiene may be dissolved in one or more of the monomers used to form the rigid phase, and the elastomer solution is fed into the reaction system. During the reaction, which may be thermally or chemically initiated, the elastomer is grafted with the rigid copolymer (i.e., SAN). Bulk copolymer (referred to also as free copolymer, matrix copolymer, or non-grafted copolymer) is also formed within the continuous phase containing the dissolved rubber. As polymerization continues, domains of free copolymer are formed within the continuous phase of rubber/comonomers to provide a two-phase system. As polymerization proceeds, and more free copolymer is formed, the elastomer-modified copolymer starts to disperse itself as particles in the free copolymer and the free copolymer becomes a continuous phase (phase inversion). Some free copolymer is generally occluded within the elastomer-modified copolymer phase as well. Following the phase inversion, additional heating may be used to complete polymerization. Numerous modifications of this basis process have been described, for example in U.S. Pat. No. 3,511,895, which describes a continuous bulk ABS process that provides controllable molecular weight distribution and microgel particle size using a three-stage reactor system. In the first reactor, the elastomer/monomer solution is charged into the reaction mixture under high agitation to precipitate discrete rubber particle uniformly throughout the reactor mass before appreciable cross-linking can occur. Solids levels of the first, the second, and the third reactor are carefully controlled so that molecular weights fall into a desirable range. U.S. Pat. No. 3,981,944 discloses extraction of the elastomer particles using the styrenic monomer to dissolve/disperse the elastomer particles, prior to addition of the unsaturated monomer comprising a nitrile group and any other comonomers. U.S. Pat. No. 5,414,045 discloses reacting in a plug flow grafting reactor a liquid feed composition comprising a styrenic monomer composition, an unsaturated nitrile monomer composition, and an elastomeric butadiene polymer to a point prior to phase inversion, and reacting the first polymerization product (grafted elastomer) therefrom in a continuous-stirred tank reactor to yield a phase inverted second polymerization product that then can be further reacted in a finishing reactor, and then devolatilized to produce the desired final product.

In addition to the bulk polymerized ABS, the impact modifier composition comprises an additional impact modifier that is different than the ABS. These impact modifiers include elastomer-modified graft copolymers comprising (i) an elastomeric (i.e., rubbery) polymer substrate having a Tg less than about 10° C., more specifically less than about −10° C., or more specifically about −40° to −80° C., and (ii) a rigid polymeric superstrate grafted to the elastomeric polymer substrate. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers. In one embodiment, the elastomer phase of the impact modifier is diene or butadiene based.

Suitable conjugated diene monomers for preparing the elastomer phase are of formula (8) above wherein each $X^b$ is independently hydrogen, $C_1$-$C_5$ alkyl, and the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula (9) above, wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, combinations comprising at least one of the foregoing compounds, and the like. Styrene and/or alpha-methylstyrene are commonly used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (10) wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, and the like. Examples of monomers of formula (10) include acrylonitrile, ethacrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Certain (meth)acrylate monomers may also be used to provide the elastomer phase, including cross-linked, particulate emulsion homopolymers or copolymers of $C_{1-16}$ alkyl (meth)acrylates, specifically $C_{1-9}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-16}$ alkyl (meth)acrylate monomers may optionally be polymerized in admixture with up to 15 wt. % of comonomers of generic formulas (8), (9), or (10) as broadly described above. Exemplary comonomers include but are not limited to butadiene, isoprene, styrene, methyl methacrylate, phenyl methacrylate, phenethylmethacrylate, N-cyclohexylacrylamide, vinyl methyl ether or acrylonitrile, and mixtures comprising at least one of the foregoing comonomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of about 0.001 to about 25 micrometers, specifically about 0.01 to about 15 micrometers, or even more specifically about 0.1 to about 8 micrometers may be used for emulsion based polymerized rubber lattices. A particle size of about 0.5 to about 10 micrometers, specifically about 0.6 to about 1.5 micrometers may be used for bulk polymerized rubber substrates. The elastomer phase may be a particulate, moderately cross-linked copolymer derived from conjugated butadiene or $C_{4-9}$ alkyl acrylate rubber, and preferably has a gel content greater than 70%. Also suitable are copolymers derived from mixtures of butadiene with styrene, acrylonitrile, and/or $C_{4-6}$ alkyl acrylate rubbers.

In one embodiment, the elastomer phase comprises elastomeric copolymers of $C_{1-8}$ alkyl (meth)acrylates with butadiene.

The elastomeric phase may provide about 5 to about 95 wt. % of the elastomer-modified graft copolymer, more specifically about 20 to about 90 wt. %, and even more specifically about 40 to about 85 wt. %, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above broadly described monovinylaromatic monomers of formula (9) may be used in the rigid graft phase, including styrene, alpha-methyl styrene, halostyrenes such as dibromostyrene, vinyltoluene, vinylxylene, butylstyrene, para-hydroxystyrene, methoxystyrene, and others, or combinations comprising at least one of the foregoing monovinylaromatic monomers. Suitable comonomers include, for example, the above broadly described monovinylic monomers and/or monomers of the general formula (10). In one embodiment, R is hydrogen or $C_1$-$C_2$ alkyl, and $X^c$ is cyano or $C_1$-$C_{12}$ alkoxycarbonyl. Specific examples of suitable comonomers for use in the rigid phase include acrylonitrile, ethacrylonitrile, methacrylonitrile, methyl (meth) acrylate, ethyl (meth)acrylate, n-propyl (meth)acrylate, isopropyl (meth)acrylate, and the like, and combinations comprising at least one of the foregoing comonomers.

In one specific embodiment, the rigid graft phase is formed from styrene or alpha-methyl styrene copolymerized with ethyl acrylate and/or methyl methacrylate. In other specific embodiments, the rigid graft phase is formed from styrene copolymerized with methyl methacrylate; and styrene copolymerized with methyl methacrylate and acrylonitrile.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 100 wt. % of monovinyl aromatic monomer, specifically about 30 to about 100 wt. %, more specifically about 50 to about 90 wt. % monovinylaromatic monomer, with the balance being comonomer(s).

Depending on the amount of elastomer-modified polymer present, a separate matrix or continuous phase of ungrafted rigid polymer or copolymer may be simultaneously obtained along with the additional elastomer-modified graft copolymer. Typically, such impact modifiers comprise about 40 to about 95 wt. % elastomer-modified graft copolymer and about 5 to about 65 wt. % rigid (co)polymer, based on the total weight of the impact modifier. In another embodiment, such impact modifiers comprise about 50 to about 85 wt. %, more specifically about 75 to about 85 wt. % rubber-modified rigid copolymer, together with about 15 to about 50 wt. %, more specifically about 15 to about 25 wt. % rigid (co)polymer, based on the total weight of the impact modifier.

Specific examples of elastomer-modified graft copolymers that differ from the bulk polymerized ABS include but are not limited to acrylonitrile-styrene-butyl acrylate (ASA), methyl methacrylate-acrylonitrile-butadiene-styrene (MABS), methyl methacrylate-butadiene-styrene (MBS), and acrylonitrile-ethylene-propylene-diene-styrene (AES). The MBS resins may be prepared by emulsion polymerization of methacrylate and styrene in the presence of polybutadiene as is described in U.S. Pat. No. 6,545,089, which process is summarized below.

In practice, many of the above described impact modifiers different from the bulk polymerized ABS may be used, as long as it does not adversely affect flame performance or other physical properties. Processes for the formation of the elastomer-modified graft copolymers include mass, emulsion, suspension, and solution processes, or combined processes such as bulk-suspension, emulsion-bulk, bulk-solution or other techniques, using continuous, semibatch, or batch processes. In one embodiment, the impact modifier different from the bulk polymerized ABS is a methacrylate-modified butadiene impact modifier, wherein the rigid phase comprises any of the foregoing materials listed as suitable for the rigid phase, such as styrene or other monovinyl aromatic monomers.

The impact modifier may be prepared by an emulsion polymerization process that is free of basic species, for example species such as alkali metal salts of $C_{6-30}$ fatty acids, for example sodium stearate, lithium stearate, sodium oleate, potassium oleate, and others, alkali metal carbonates, amines such as dodecyl dimethyl amine, dodecyl amine, and others, and ammonium salts of amines, if desired, but it is not a requirement. Such materials are commonly used as polymerization aids, that is, surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers, if desired. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and combinations comprising at least one of the foregoing surfactants. A specific surfactant is a $C_{6-16}$, specifically a $C_{8-12}$ alkyl sulfonate. This emulsion polymerization process is described and disclosed in various patents and literature of such companies as Rohm & Haas and General Electric Company.

In addition to the bulk polymerized ABS and the additional impact modifier differing from the bulk polymerized ABS, the impact modifier composition may further comprise an ungrafted rigid copolymer. The rigid copolymer is additional to any rigid copolymer present in the bulk polymerized ABS or additional impact modifier. It may be the same as any of the rigid copolymers described above, without the elastomer modification. The rigid copolymers generally have a Tg greater than about 15° C., specifically greater than about 20° C., and include, for example, polymers derived from monovinylaromatic monomers containing condensed aromatic ring structures, such as vinyl naphthalene, vinyl anthracene and the like, or monomers of formula (9) as broadly described above, for example styrene and alpha-methyl styrene; monovinylic monomers such as itaconic acid, acrylamide, N-substituted acrylamide or methacrylamide, maleic anhydride, maleimide, N-alkyl, aryl or haloaryl substituted maleimide, glycidyl (meth)acrylates, and monomers of the general formula (10) as broadly described above, for example acrylonitrile, methyl acrylate and methyl methacrylate; and copolymers of the foregoing, for example styrene-acrylonitrile (SAN), styrene-alpha-methyl styrene-acrylonitrile, methyl methacrylate-acrylonitrile-styrene, and methyl methacrylate-styrene.

The rigid copolymer may comprise about 1 to about 99 wt. %, specifically about 20 to about 95 wt. %, more specifically about 40 to about 90 wt. % of vinylaromatic monomer, together with 1 to about 99 wt. %, specifically about 5 to about 80 wt. %, more specifically about 10 to about 60 wt. % of copolymerizable monovinylic monomers. In one embodiment the rigid copolymer is SAN, which may comprise about 50 to about 99 wt. % styrene, with the balance acrylonitrile, specifically about 60 to about 90 wt. % styrene, and more specifically about 65 to about 85 wt. % styrene, with the remainder acrylonitrile.

The rigid copolymer may be manufactured by bulk, suspension, or emulsion polymerization, and is substantially free of impurities, residual acids, residual bases or residual metals that may catalyze the hydrolysis of polycarbonate. In one embodiment, the rigid copolymer is manufactured by bulk polymerization using a boiling reactor. The rigid copolymer may have a weight average molecular weight of about 50,000 to about 300,000 as measured by GPC using polystyrene standards. In one embodiment, the weight average molecular weight of the rigid copolymer is about 70,000 to about 190,000.

In addition to the foregoing components previously described, the polycarbonate compositions further comprise a phosphorus containing flame retardant, for example an organic phosphates and/or an organic compound containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis (2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

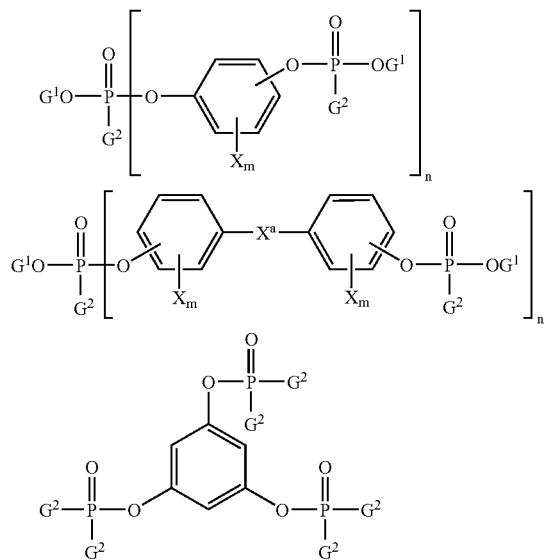

wherein each $G^1$ is independently a hydrocarbon having 1 to about 30 carbon atoms; each $G^2$ is independently a hydrocarbon or hydrocarbonoxy having 1 to about 30 carbon atoms; each X is independently a bromine or chlorine; m 0 to 4, and n is 1 to about 30. Examples of suitable di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A (, respectively, their oligomeric and polymeric counterparts, and the like. Methods for the preparation of the aforementioned di- or polyfunctional aromatic compounds are described in British Patent No. 2,043,083.

Exemplary suitable flame retardant compounds containing phosphorus-nitrogen bonds include phosphonitrilic chloride, phosphorus ester amides, phosphoric acid amides, phosphonic acid amides, phosphinic acid amides, tris(aziridinyl) phosphine oxide. The organic phosphorus-containing flame retardants are generally present in amounts of about 0.5 to about 20 parts by weight, based on 100 parts by weight of the total composition, exclusive of any filler.

The thermoplastic composition may be essentially free of chlorine and bromine, particularly chlorine and bromine flame retardants. "Essentially free of chlorine and bromine" as used herein refers to materials produced without the intentional addition of chlorine, bromine, and/or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine may be defined as having a bromine and/or chlorine content of less than or equal to about 100 parts per million by weight (ppm), less than or equal to about 75 ppm, or less than or equal to about 50 ppm. When this definition is applied to the fire retardant it is based on the total weight of the fire retardant. When this definition is applied to the thermoplastic composition it is based on the total weight of polycarbonate, impact modifier and fire retardant.

Optionally, inorganic flame retardants may also be used, for example sulfonate salts such as potassium perfluorobutane sulfonate (Rimar salt) and potassium diphenylsulfone sulfonate; salts formed by reacting for example an alkali metal or alkaline earth metal (preferably lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, $BaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of about 0.01 to about 1.0 parts by weight, more specifically about 0.05 to about 0.5 parts by weight, based on 100 parts by weight of polycarbonate resin, impact modifier, polysiloxane-polycarbonate copolymer, and phosphorus-containing flame retardant.

Exemplary suitable flame retardant compounds containing phosphorus-nitrogen bonds include phosphonitrilic chloride and tris(aziridinyl) phosphine oxide. When present, phosphorus-containing flame retardants are generally present in amounts of about 1 to about 20 parts by weight, based on 100 parts by weight of polycarbonate component and the impact modifier composition.

Halogenated materials may also be used as flame retardants, for example halogenated compounds and resins of the formula (11):

(11)

wherein R is an alkylene, alkylidene or cycloaliphatic linkage, e.g., methylene, propylene, isopropylidene, cyclohexylene, cyclopentylidene, and the like; an oxygen ether, carbonyl, amine, or a sulfur containing linkage, e.g., sulfide, sulfoxide, sulfone, and the like; or two or more alkylene or alkylidene linkages connected by such groups as aromatic, amino, ether, carbonyl, sulfide, sulfoxide, sulfone, and the like groups; Ar and Ar' are each independently a mono- or polycarbocyclic aromatic group such as phenylene, biphenylene, terphenylene, naphthylene, and the like, wherein hydroxyl and Y substituents on Ar and Ar' can be varied in the ortho, meta or para positions on the aromatic rings and the groups can be in any possible geometric relationship with respect to one another; each Y is independently an organic, inorganic or organometallic radical, for example (1) a halogen such as chlorine, bromine, iodine, or fluorine, (2) an ether group of the general formula —OE, wherein E is a monovalent hydrocarbon radical similar to X, (3) monovalent hydrocarbon groups of the type represented by R or (4) other substituents, e.g., nitro, cyano, and the like, said substituents being essentially inert provided there be at least one and preferably two halogen atoms per aryl nucleus; each X is independently a monovalent $C_{1-18}$ hydrocarbon group such as methyl, propyl, isopropyl, decyl, phenyl, naphthyl, biphenyl, xylyl, tolyl, benzyl, ethylphenyl, cyclopentyl, cyclohexyl, and the like, each optionally containing inert substituents; each d is independently 1 to a maximum equivalent to the number of replaceable hydrogens substituted on the aromatic rings comprising Ar or Ar'; each e is independently 0 to a maximum equivalent to the number of replaceable hydrogens on R; and each a, b, and c is independently a whole number, including 0, with the proviso that when b is 0, either a or c, but not both, may be 0, and when b is not 0, neither a nor c may be 0.

Included within the scope of the above formula are bisphenols of which the following are representative: bis(2,6-dibromophenyl)methane; 1,1-bis-(4-iodophenyl)ethane; 2,6-bis (4,6-dichloronaphthyl)propane; 2,2-bis(2,6-dichlorophenyl) pentane; bis(4-hydroxy-2,6-dichloro-3-methoxyphenyl) methane; and 2,2-bis(3-bromo-4-hydroxyphenyl)propane. Also included within the above structural formula are 1,3-dichlorobenzene, 1,4-dibrombenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like. Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants are generally used in amounts of about 1 to about 50 parts by weight, based on 100 parts by weight of the polycarbonate component and the impact modifier composition.

Another useful type of flame retardant is a polysiloxane-polycarbonate copolymer having polydiorganosiloxane blocks comprise repeating structural units of formula (12):

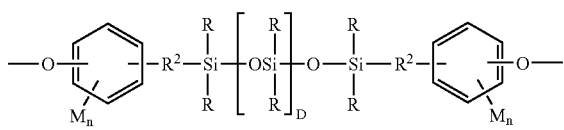

(12)

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer. $R^2$ in formula (6) is a divalent $C_1$-C8 aliphatic group. Each M in formula (7) may be the same or different, and may be a halogen, cyano, nitro, $C_1$-C8 alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

D in formula (6) is selected so as to provide an effective level of flame retardance to the polycarbonate composition. The value of D will therefore vary depending on the relative amount of each component in the polycarbonate composition, including the amount of polycarbonate, impact modifier, polysiloxane-polycarbonate copolymer, and other flame retardants. Suitable values for D may be determined by one of ordinary skill in the art without undue experimentation using the guidelines taught herein. Generally, D has an average value of 10 to about 250, specifically about 10 to about 60.

In one embodiment, M is independently bromo or chloro, a $C_1$-$C_3$ alkyl group such as methyl, ethyl, or propyl, a $C_1$-$C_3$ alkoxy group such as methoxy, ethoxy, or propoxy, or a $C_6$-$C_7$ aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

The polysiloxane-polycarbonate copolymer may be manufactured by reaction of the corresponding dihydroxy polysiloxane with a carbonate source and a dihydroxy aromatic compound of formula (3), as described above for polycarbonates. Generally, the amount of dihydroxy polydiorganosiloxane is selected so as to produce a copolymer comprising about 1 to about 60 mole percent of polydiorganosiloxane blocks relative to the moles of polycarbonate blocks, and more generally, about 3 to about 50 mole percent of polydiorganosiloxane blocks relative to the moles of polycarbonate blocks. When present, the copolymers may be used in amounts of about 5 to about 50 parts by weight, more specifically about 10 to about 40 parts by weight, based on 100 parts by weight of polycarbonate component and the impact modifier composition.

Inorganic flame retardants may also be used, for example salts of $C_{2-16}$ alkyl sulfonates such as potassium perfluorobutane sulfonate (Rimar salt), potassium perfluorooctane sulfonate, tetraethylammonium perfluorohexane sulfonate, and potassium diphenylsulfone sulfonate; salts such as $CaCO_3$, $BaCO_3$, and $BaCO_3$; salts of fluoro-anion complex such as $Li_3AlF_6$, $BaSiF_6$, $KBF_4$, $K_3AlF_6$, $KAlF_4$, $K_2SiF_6$, and $Na_3AlF_6$; and the like. When present, inorganic flame retardant salts are generally present in amounts of about 0.01 to about 25 parts by weight, more specifically about 0.1 to about 10 parts by weight, based on 100 parts by weight of the polycarbonate component and the impact modifier composition.

The relative amount of each component of the thermoplastic composition will depend on the particular type of polycarbonate(s) used, the presence of any other resins, and the particular impact modifiers, including any rigid graft copolymer, as well as the desired properties of the composition. Particular amounts may be readily selected by one of ordinary skill in the art using the guidance provided herein.

In one embodiment, the thermoplastic composition comprises about 50 to about 90 wt. % polycarbonate component, about 3 to about 35 wt. % of an impact modifier composition comprising a) about 3 to about 25 wt. % bulk polymerized ABS (BABS), and b) about 0.5 to about 10 wt. % additional elastomer-modified impact modifier different from BABS, and about 2 to about 25 wt. % flame retardant. In another embodiment, the thermoplastic composition comprises about 60 to about 80 wt. % polycarbonate component, about 6 to about 30 wt. % of an impact modifier composition comprising a) about 5 to about 20 wt. % bulk polymerized ABS, and b) about 1 to about 10 wt. % other elastomer-modified impact modifier, and about 5 to about 20 wt. % flame retardant. In another embodiment, the thermoplastic composition comprises about 65 to about 75 wt. % polycarbonate component, about 10 to about 25 wt. % of an impact modifier composition comprising a) about 8 to about 15 wt. % bulk polymerized ABS, about 2 to about 10 wt. % additional elastomer-modified impact modifier, and about 10 to about 17 wt. % flame retardant. The foregoing compositions may further optionally comprise a rigid copolymer (i.e. SAN), if desired and if it does not detract from the physical properties and flame performance. All of the foregoing amounts are based on the combined weight of the polycarbonate composition and the impact modifier composition.

As a specific example of the foregoing embodiments, there is provided a thermoplastic composition that comprises about 65 to about 75 wt. % of a polycarbonate component; about 9 to about 22 wt. % of an impact modifier composition comprising a) about 8 to about 15 wt. % of a bulk polymerized ABS impact modifier; and b) about 1.5 to about 7 wt. % of MBS; and about 10 to about 17 wt. % of BPADP. Use of the foregoing amounts may provide compositions having enhanced impact strength, ductility and flow together with good flame performance, particularly at low temperatures.

In addition to the polycarbonate component, the impact modifier composition and the flame retardant, the thermoplastic composition may include various additives such as fillers, reinforcing agents, stabilizers, and the like, with the proviso that the additives do not adversely affect the desired properties of the thermoplastic compositions, in particular thermal stability. Thus, additives that contain impurities or that would generate degradation catalysts in the presence of moisture and/or heat, for example hydrolytically unstable phosphites, may not be as desirable. Additives that may themselves as act as catalysts for the degradation of polycarbonates in the presence of moisture and/or heat may also not be desirable.

In one embodiment, the additives may be treated to prevent or substantially reduce any degradative activity if desired. Such treatments may include coating with a substantially inert substance such as silicone, acrylic, or epoxy resins. Treatment may also comprise chemical passivation to remove, block, or neutralize catalytic sites. A combination of treatments may be used. Additives such as fillers, reinforcing agents, and pigments may be treated.

Mixtures of additives may be used. Such additives may be mixed at a suitable time during the mixing of the components for forming the composition. Suitable fillers or reinforcing agents that may be used include, for example, silicates and silica powders such as aluminum silicate (mullite), synthetic calcium silicate, zirconium silicate, fused silica, crystalline silica graphite, natural silica sand, and the like; boron powders such as boron-nitride powder, boron-silicate powders, and the like; oxides such as $TiO_2$, aluminum oxide, magnesium oxide, and the like; calcium sulfate (as its anhydride, dihydrate or trihydrate); calcium carbonates such as chalk, limestone, marble, synthetic precipitated calcium carbonates, and the like; talc, including fibrous, modular, needle shaped, lamellar talc, and the like; wollastonite; surface-treated wollastonite; glass spheres such as hollow and solid glass spheres, silicate spheres, cenospheres, aluminosilicate (armospheres), and the like; kaolin, including hard kaolin, soft kaolin, calcined kaolin, kaolin comprising various coatings known in the art to facilitate compatibility with the polymeric matrix resin, and the like; single crystal fibers or "whiskers" such as silicon carbide, alumina, boron carbide, iron, nickel, copper, and the like; fibers (including continuous and chopped fibers) such as asbestos, carbon fibers, glass fibers, such as E, A, C, ECR, R, S, D, or NE glasses, and the like; sulfides such as molybdenum sulfide, zinc sulfide and the like; barium species such as barium titanate, barium ferrite, barium sulfate, heavy spar, and the like; metals and metal oxides such as particulate or fibrous aluminum, bronze, zinc, copper and nickel and the like; flaked fillers such as glass flakes, flaked silicon carbide, aluminum diboride, aluminum flakes, steel flakes and the like; fibrous fillers, for example short inorganic fibers such as those derived from blends comprising at least one of aluminum silicates, aluminum oxides, magnesium oxides, and calcium sulfate hemihydrate and the like; natural fillers and reinforcements, such as wood flour obtained by pulverizing wood, fibrous products such as cellulose, cotton, sisal, jute, starch, cork flour, lignin, ground nut shells, corn, rice grain husks and the like; organic fillers such as polytetrafluoroethylene (Teflon) and the like; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) and the like; as well as additional fillers and reinforcing agents such as mica, clay, feldspar, flue dust, finite, quartz, quartzite, perlite, tripoli, diatomaceous earth, carbon black, and the like, and combinations comprising at least one of the foregoing fillers and reinforcing agents. The fillers/reinforcing agents may be coated to prevent reactions with the matrix or may be chemically passivated to neutralize catalytic degradation site that might promote hydrolytic or thermal degradation.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber and the like. Fibrous fillers may be supplied in the form of, for example, rovings, woven fibrous reinforcements, such as 0-90 degree fabrics and the like; non-woven fibrous reinforcements such as continuous strand mat, chopped strand mat, tissues, papers and felts and the like; or three-dimensional reinforcements such as braids. Fillers are generally used in amounts of about 0 to about 100 parts by weight, based on 100 parts by weight of the polycarbonate component and the impact modifier composition.

Suitable antioxidant additives include, for example, alkylated monophenols or polyphenols; alkylated reaction products of polyphenols with dienes, such as tetrakis[methylene (3,5-di-tert-butyl-4-hydroxyhydrocinnamate)] methane, and the like; butylated reaction products of para-cresol or dicyclopentadiene; alkylated hydroquinones; hydroxylated thiodiphenyl ethers; alkylidene-bisphenols; benzyl species; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; and the like; and combinations comprising at least one of the foregoing antioxidants. Antioxidants are generally used in amounts of about 0.01 to about 1, specifically about 0.1 to about 0.5 parts by weight, based on 100 parts by weight of parts by weight of the polycarbonate component and the impact modifier composition.

Suitable heat and color stabilizer additives include, for example, organophosphites such as tris(2,4-di-tert-butyl phenyl) phosphite. Heat and color stabilizers are generally used in amounts of about 0.01 to about 5, specifically about 0.05 to about 0.3 parts by weight, based on 100 parts by weight of parts by weight of the polycarbonate component and the impact modifier composition.

Suitable secondary heat stabilizer additives include, for example thioethers and thioesters such as pentaerythritol tetrakis (3-(dodecylthio)propionate), pentaerythritol tetrakis[3-(3,5-di-tert-butyl-4-hydroxyphenyl)propionate], dilauryl thiodipropionate, distearyl thiodipropionate, dimyristyl thiodipropionate, ditridecyl thiodipropionate, pentaerythritol octylthiopropionate, dioctadecyl disulphide, and the like, and combinations comprising at least one of the foregoing heat stabilizers. Secondary stabilizers are generally used in amount of about 0.01 to about 5, specifically about 0.03 to about 0.3 parts by weight, based upon 100 parts by weight of parts by weight of the polycarbonate component and the impact modifier composition.

Light stabilizers, including ultraviolet light (UV) absorbing additives, may also be used. Suitable stabilizing additives of this type include, for example, benzotriazoles and hydroxybenzotriazoles such as 2-(2-hydroxy-5-methylphenyl)benzotriazole, 2-(2-hydroxy-5-tert-octylphenyl)-benzotriazole, 2-(2H-benzotriazol-2-yl)-4-(1,1,3,3-tetramethylbutyl)-phenol (CYASORB™ 5411 from Cytec), and TINUVIN™ 234 from Ciba Specialty Chemicals; hydroxybenzotriazines; hydroxyphenyl-triazine or—pyrimidine UV absorbers such as TINUVIN™ 1577 (Ciba), and 2-[4,6-bis (2,4-dimethylphenyl)-1,3,5-triazin-2-yl]-5-(octyloxy)-phenol (CYASORB™ 1164 from Cytec); non-basic hindered amine light stabilizers (hereinafter "HALS"), including substituted piperidine moieties and oligomers thereof, for example 4-piperidinol derivatives such as TINUVIN™ 622 (Ciba), GR-3034, TINUVIN™ 123, and TINUVIN™ 440; benzoxazinones, such as 2,2'-(1,4-phenylene)bis(4H-3,1-benzoxazin-4-one) (CYASORB™ UV-3638); hydroxybenzophenones such as 2-hydroxy-4-n-octyloxybenzophenone (CYASORB™ 531); oxanilides; cyanoacrylates such as 1,3-bis[(2-cyano-3,3-diphenylacryloyl)oxy]-2,2-bis[[(2-cyano-3,3-diphenylacryloyl)oxy]methyl]propane (UVINUL™ 3030) and 1,3-bis[(2-cyano-3,3-diphenylacryloyl)oxy]-2,2-bis[[(2-cyano-3,3-diphenylacryloyl)oxy]methyl]propane; and nano-size inorganic materials such as titanium oxide, cerium oxide, and zinc oxide, all with particle size less than about 100 nanometers; and the like, and combinations comprising at least one of the foregoing stabilizers. Light stabilizers may be used in amounts of about 0.01 to about 10, specifically about 0.1 to about 1 parts by weight, based on 100 parts by weight of parts by weight of the polycarbonate component and the impact modifier composition. UV absorbers are generally used in amounts of about 0.1 to about 5 parts by weight, based on 100 parts by weight of the polycarbonate component and the impact modifier composition.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax and the like; and poly alpha olefins such as Ethylflo™ 164, 166, 168, and 170. Such materials are generally used in amounts of about 0.1 to about 20 parts by weight, specifically about 1 to about 10 parts by weight, based on 100 parts by weight of the polycarbonate component and the impact modifier composition.

Colorants such as pigment and/or dye additives may also be present. Suitable pigments include for example, inorganic pigments such as metal oxides and mixed metal oxides such as zinc oxide, titanium dioxides, iron oxides and the like; sulfides such as zinc sulfides, and the like; aluminates; sodium sulfo-silicates sulfates, chromates, and the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, and combinations comprising at least one of the foregoing pigments. Pigments may be coated to prevent reactions with the matrix or may be chemically passivated to neutralize catalytic degradation site that might promote hydrolytic or thermal degradation. Pigments are generally used in amounts of about 0.01 to about 10 parts by weight, based on 100 parts by weight of parts by weight of the polycarbonate component and the impact modifier composition.

Suitable dyes are generally organic materials and include, for example, coumarin dyes such as coumarin 460 (blue), coumarin 6 (green), nile red and the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, and the like; luminescent dyes such as 5-amino-9-diethyliminobenzo(a)phenoxazonium perchlorate; 7-amino-4-methylcarbostyryl; 7-amino-4-methylcoumarin; 7-amino-4-trifluoromethylcoumarin; 3-(2'-benzimidazolyl)-7-N,N-diethylaminocoumarin; 3-(2'-benzothiazolyl)-7-diethylaminocoumarin; 2-(4-biphenylyl)-5-(4-t-butylphenyl)-1,3,4-oxadiazole; 2-(4-biphenylyl)-5-phenyl-1,3,4-oxadiazole; 2-(4-biphenyl)-6-phenylbenzoxazole-1,3; 2,5-bis-(4-biphenylyl)-1,3,4-oxadiazole; 2,5-bis-(4-biphenylyl)-oxazole; 4,4'-bis-(2-butyloctyloxy)-p-quaterphenyl; p-bis(o-methylstyryl)-benzene; 5,9-diaminobenzo(a)phenoxazonium perchlorate; 4-dicyanomethylene-2-methyl-6-(p-dimethylaminostyryl)-4H-pyran; 1,1'-diethyl-2,2'-carbocyanine iodide; 1,1'-diethyl-4,4'-carbocyanine iodide; 3,3'-diethyl-4,4',5,5'-dibenzothiatricarbocyanine iodide; 1,1'-diethyl-4,4'-dicarbocyanine iodide; 1,1'-diethyl-2,2'-dicarbocyanine iodide; 3,3'-diethyl-9,11-neopentylenethiatricarbocyanine iodide; 1,3'-diethyl-4,2'-quinolyloxacarbocyanine iodide; 1,3'-diethyl-4,2'-quinolylthiacarbocyanine iodide; 3-diethylamino-7-diethyliminophenoxazonium perchlorate; 7-diethylamino-4-methylcoumarin; 7-diethylamino-4-trifluoromethylcoumarin; 7-diethylaminocoumarin; 3,3'-diethyloxadicarbocyanine iodide; 3,3'-diethylthiacarbocyanine iodide; 3,3'-diethylthiadicarbocyanine iodide; 3,3'-diethylthiatricarbocyanine iodide; 4,6-dimethyl-7-ethylaminocoumarin; 2,2'-dimethyl-p-quaterphenyl; 2,2-dimethyl-p-terphenyl; 7-dimethylamino-1-methyl-4-methoxy-8-azaquinolone-2; 7-dimethylamino-4-methylquinolone-2; 7-dimethylamino-4-trifluoromethylcoumarin; 2-(4-(4-dimethylaminophenyl)-1,3-butadienyl)-3-ethylbenzothiazolium perchlorate; 2-(6-(p-dimethylaminophenyl)-2,4-neopentylene-1,3,5-hexatrienyl)-3-methylbenzothiazolium perchlorate; 2-(4-(p-dimethylaminophenyl)-1,3-butadienyl)-1,3,3-trimethyl-3H-indolium perchlorate; 3,3'-dimethyloxatricarbocyanine iodide; 2,5-diphenylfuran; 2,5-diphenyloxazole; 4,4'-diphenylstilbene; 1-ethyl-4-(4-(p-dimethylaminophenyl)-1,3-butadienyl)-pyridinium perchlorate; 1-ethyl-2-(4-(p-dimethylaminophenyl)-1,3-butadienyl)-pyridinium perchlorate; 1-ethyl-4-(4-(p-dimethylaminophenyl)-1,3-butadienyl)-quinolium perchlorate; 3-ethylamino-7-ethylimino-2,8-dimethylphenoxazin-5-ium perchlorate; 9-ethylamino-5-ethylamino-10-methyl-5H-benzo(a) phenoxazonium perchlorate; 7-ethylamino-6-methyl-4-trifluoromethylcoumarin; 7-ethylamino-4-trifluoromethylcoumarin; 1,1',3,3,3',3'-hexamethyl-4,4',5,5'-dibenzo-2,2'-indotricarboccyanine iodide; 1,1',3,3,3',3'-hexamethylindodicarbocyanine iodide; 1,1',3,3,3',3'-hexamethylindotricarbocyanine iodide; 2-methyl-5-t-butyl-p-quaterphenyl; N-methyl-4-trifluorometh-ylpiperidino-<3,2-g>coumarin; 3-(2'-N-methylbenzimidazolyl)-7-N,N-diethylaminocoumarin; 2-(1-naphthyl)-5-phenyloxazole; 2,2'-p-phenylen-bis(5-phenyloxazole); 3,5,3'''',5''''-tetra-t-butyl-p-sexiphenyl; 3,5,3'''',5''''-tetra-t-butyl-p-quinquephenyl; 2,3,5,6-1H,4H-tetrahydro-9-acetylquinolizino-<9,9a,1-gh>coumarin; 2,3,5,6-1H,4H-tetrahydro-9-carboethoxyquinolizino-<9,9a,1-gh>coumarin; 2,3,5,6-1H,4H-tetrahydro-8-methylquinolizino-<9,9a,1-gh>coumarin; 2,3,5,6-1H,4H-tetrahydro-9-(3-pyridyl)-quinolizino-<9,9a,1-gh>coumarin; 2,3,5,6-1H,4H-tetrahydro-8-trifluoromethylquinolizino-<9,9a,1-gh>coumarin; 2,3,5,6-1H,4H-tetrahydroquinolizino-<9,9a,1-gh>coumarin; 3,3',2'',3'''-tetramethyl-p-quaterphenyl; 2,5,2'''',5''''-tetramethyl-p-quinquephenyl; P-terphenyl; P-quaterphenyl; nile red; rhodamine 700; oxazine 750; rhodamine 800; IR 125; IR 144; IR 140; IR 132; IR 26; IR5; diphenylhexatriene; diphenylbutadiene; tetraphenylbutadiene; naphthalene; anthracene; 9,10-diphenylanthracene; pyrene; chrysene; rubrene; coronene; phenanthrene and the like, and combinations comprising at least one of the foregoing dyes. Dyes are generally used in amounts of about 0.1 parts per million to about 10 parts by weight, based on 100 parts by weight of parts by weight of the polycarbonate component and the impact modifier composition.

Monomeric, oligomeric, or polymeric antistatic additives that may be sprayed onto the article or processed into the thermoplastic composition may be advantageously used. Examples of monomeric antistatic agents include long chain esters such as glycerol monostearate, glycerol distearate, glycerol tristearate, and the like, sorbitan esters, and ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate and the like, fluorinated alkylsulfonate salts, betaines, and the like. Combinations of the foregoing antistatic agents may be used. Exemplary polymeric antistatic agents include certain polyetheresters, each containing polyalkylene glycol moieties such as polyethylene glycol, polypropylene glycol, polytetramethylene glycol, and the like. Such polymeric antistatic agents are commercially available, and include, for example PELESTAT™ 6321 (Sanyo), PEBAX™ MH1657 (Atofina), and IRGASTAT™ P18 and P22 (Ciba-Geigy). Other polymeric materials that may be used as antistatic agents are inherently conducting polymers such as polythiophene (commercially available from Bayer), which retains some of its intrinsic conductivity after melt processing at elevated temperatures. In one embodiment, carbon fibers, carbon nanofibers, carbon nanotubes, carbon black or any combination of the foregoing may be used in a polymeric resin containing chemical antistatic agents to render the composition electrostatically dissipative. Antistatic agents are generally used in amounts of about 0.1 to about 10 parts by weight, specifically about based on 100 parts by weight of the polycarbonate component and the impact modifier composition.

Where a foam is desired, suitable blowing agents include, for example, low boiling halohydrocarbons and those that generate carbon dioxide; blowing agents that are solid at room temperature and when heated to temperatures higher than their decomposition temperature, generate gases such as nitrogen, carbon 25 dioxide ammonia gas, such as azodicarbonamide, metal salts of azodicarbonamide, 4,4'-oxybis(benzenesulfonylhydrazide), sodium bicarbonate, ammonium carbonate, and the like, or combinations comprising at least one of the foregoing blowing agents. Blowing agents are generally used in amounts of about 0.5 to about 20 parts by weight, based on 100 parts by weight of polycarbonate component and the impact modifier composition.

Anti-drip agents may also be used, for example a fibril forming or non-fibril forming fluoropolymer such as polytetrafluoroethylene (PTFE). The anti-drip agent may be encapsulated by a rigid copolymer as described above, for example SAN. PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. A suitable TSAN may comprise, for example, about 50 wt. % PTFE and about 50 wt. % SAN, based on the total weight of the encapsulated fluoropolymer. The SAN may comprise, for example, about 75 wt. % styrene and about 25 wt. % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. Antidrip agents are generally used in amounts of about 0.1 to about 10 parts by weight, based on 100 parts by weight of polycarbonate component and the impact modifier composition.

The thermoplastic compositions may be manufactured by methods generally available in the art, for example, in one embodiment, in one manner of proceeding, powdered polycarbonate or polycarbonates, other resin if used, impact modifier composition, and/or other optional components are first blended, optionally with chopped glass strands or other fillers in a Henschel™ high speed mixer. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Such additives may also be compounded into a masterbatch with a desired polymeric resin and fed into the extruder. The additives may be added to either the polycarbonate base materials or the impact modifier base material to make a concentrate, before this is added to the final product. The extruder is generally operated at a temperature higher than that necessary to cause the composition to flow, typically 500° F. (260° C.) to 650° F. (343° C.). The extrudate is immediately quenched in a water batch and pelletized. The pellets, so prepared, when cutting the extrudate may be one-fourth inch long or less as desired. Such pellets may be used for subsequent molding, shaping, or forming.

Shaped, formed, or molded articles comprising the thermoplastic compositions are also provided. The thermoplastic compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like.

The compositions find particular utility in business equipment and equipment housings, such as computers, notebook computers, cell phones, Personal Data Assistants (PDAs), printers, copiers, projectors, facsimile machines, and other equipment and devices known in the art.

The thermoplastic compositions described herein have significantly improved thermal stability and a good balance of properties. In a particularly advantageous feature, the thermoplastic compositions may achieve improved thermal stability and flame performance without significant degradation in ductility and impact strength.

The thermoplastic compositions have a significantly improved balance of physical properties such as flow, impact and flow, as well as flame performance. Melt flow rate (MFR) of the thermoplastic compositions of the invention is better than compositions without the specific impact modifier and flame retardant blend. MFR is the rate of extrusion of thermoplastics through an orifice at a prescribed temperature and load, and may be measured in accordance with ISO 1133 or ASTM D1238. It provides a means of measuring flow of a melted material, which can be used to determine the extent of degradation of the thermoplastic.

Melt viscosity (MV) is a measure of a polymer at a given temperature at which the molecular chains can move relative to each other. Melt viscosity is dependent on the molecular weight, in that the higher the molecular weight, the greater the entanglements and the greater the melt viscosity, and can therefore be used to determine the extent of degradation of the thermoplastic. Degraded materials would generally show increased viscosity, and could exhibit reduced physical properties. Melt viscosity is determined against different shear rates, and may be conveniently determined by ISO11443. The melt viscosity was measured at 260° C. at a shear rate of 1500 s$^{-1}$.

Heat Deflection Temperature (HDT) is a relative measure of a material's ability to perform for a short time at elevated temperatures while supporting a load. The test measures the effect of temperature on stiffness: a standard test specimen is given a defined surface stress and the temperature is raised at a uniform rate. Heat Deflection Test (HDT) was determined per ASTM D648, using a flat, 6.4 mm thick bar, molded Tensile bar subjected to 1.8 MPa. The compositions described herein may further have additional excellent physical properties and good processability. For example, the thermoplastic polycarbonate compositions may have a heat deflection temperature (HDT) of about 75 to about 105° C., more specifically about 85 to about 95° C., measured at 1.8 MPa on a 6.4 mm thick bar according to ASTM D648.

Flexural Modulus was determined using a one-fourth inch (6.4 mm) thick bar, pursuant to ASTM D790, at a speed of 2.5 mm/min.

Percent ductility was determined on one-eighth inch (3.2 mm) bars at room temperature using the impact energy as well as stress whitening of the fracture surface. Generally, stress whitening can indicate ductile failure mode; conversely, lack of stress whitening can indicate brittle failure mode. Ten bars were tested, and percent ductility is expressed as a percentage of impact bars that exhibited ductile failure mode. Ductility tends to decrease with temperature, and the ductile transition temperature is the temperature at which % ductility falls below 50%.

Notched Izod Impact strength (NII) was determined on one-eighth inch (3.2 mm) bars per ASTM D256. Izod Impact Strength ASTM D 256 is used to compare the impact resistances of plastic materials. The results are defined as the impact energy in joules used to break the test specimen, divided by the specimen area at the notch. Results are reported in J/m. The thermoplastic polycarbonate compositions may have a notched Izod Impact of greater than about 200 J/m, specifically greater than about 300 J/m, specifically greater than about 600 J/m, determined at 23° C. using a one-eighth inch (3.2 mm) thick bar per ASTM D256.

Flammability tests were performed following the procedure of Underwriter's Laboratory Bulletin 94 entitled "Tests for Flammability of Plastic Materials, UL94." According to this procedure, materials may be classified as HB, V0, UL94 V1, V2, 5VA and/or 5VB on the basis of the test results obtained for five samples. The criteria for each of these flammability classifications are described below.

V0: In a sample placed so that its long axis is 180 degrees to the flame, the average period of flaming and/or smoldering after removing the igniting flame does not exceed five seconds and none of the vertically placed samples produces drips of burning particles that ignite absorbent cotton. Five bar flame out time (FOT) is the sum of the flame out time for five bars, each lit twice for a maximum flame out time of 50 seconds. FOT1 is the average flame out time after the first light. FOT2 is the average flame out time after the second light.

V1: In a sample placed so that its long axis is 180 degrees to the flame, the average period of flaming and/or smoldering after removing the igniting flame does not exceed twenty-five seconds and none of the vertically placed samples produces drips of burning particles that ignite absorbent cotton. Five bar flame out time is the sum of the flame out time for five bars, each lit twice for a maximum flame out time of 250 seconds.

5VB: a flame is applied to a vertically fastened, 5-inch (127 mm) by 0.5-inch (12.7 mm) test bar of a given thickness above a dry, absorbent cotton pad located 12 inches (305 mm) below the bar. The thickness of the test bar is determined using calipers with 0.1 mm accuracy. The flame is a 5-inch (127 mm) flame with an inner blue cone of 1.58 inches (40 mm). The flame is applied to the test bar for 5 seconds so that the tip of the blue cone touches the lower corner of the specimen. The flame is then removed for 5 seconds. Application and removal of the flame is repeated for until the specimen has had five applications of the same flame. After the fifth application of the flame is removed, a timer (T-0) is started and the time that the specimen continues to flame (after-flame time), as well as any time the specimen continues to glow after the after-flame goes out (after-glow time), is measured by stopping T-0 when the after-flame stops, unless there is an after-glow and then T-0 is stopped when the after-glow stops. The combined after-flame and after-glow time must be less than or equal to 60 seconds after five applications of a flame to a test bar, and there may be no drips that ignite the cotton pad. The test is repeated on 5 identical bar specimens. If there is a single specimen of the five that does not comply with the time and/or no-drip requirements then a second set of 5 specimens are tested in the same fashion. All of the specimens in the second set of 5 specimens must comply with the requirements in order for material in the given thickness to achieve the 5VB standard.

The data was also analyzed by calculating the average flame out time, standard deviation of the flame out time and the total number of drips, and by using statistical methods to convert that data to a prediction of the probability of first time pass, or "p(FTP)", that a particular sample formulation would achieve a "pass" rating in the conventional UL94 V0 or V1 testing of 5 bars. The probability of a first time pass on a first submission (pFTP) may be determined according to the formula:

$$pFTP = (P_{t1>mbt,\ n=0} \times P_{t2>mbt,\ n=0} \times P_{total<=mbt} \times P_{drip,\ n=0})$$

where $P_{t1>mbt,\ n=0}$ is the probability that no first burn time exceeds a maximum burn time value, $P_{t2>mbt,\ n=0}$ is the probability that no second burn time exceeds a maximum burn time value, $P_{total<=mbt}$ is the probability that the sum of the burn times is less than or equal to a maximum total burn time value, and $P_{drip,\ n=0}$ is the probability that no specimen exhibits dripping during the flame test. First and second burn time refer to burn times after a first and second application of the flame, respectively.

The probability that no first burn time exceeds a maximum burn time value, $P_{t1>mbt,\ n=0}$ may be determined from the formula:

$$P_{t1>mbt,\ n=0} = (1 - P_{t1>mbt})^5$$

where $P_{t1>mbt}$ is the area under the log normal distribution curve for t1>mbt, and where the exponent "5" relates to the number of bars tested.

The probability that no second burn time exceeds a maximum burn time value may be determined from the formula:

$$P_{t2>mbt,\ n=0} = (1 - P_{t2>mbt})^5$$

where $P_{t2>mbt}$ is the area under the normal distribution curve for t2>mbt. As above, the mean and standard deviation of the burn time data set are used to calculate the normal distribution curve. For the UL-94 V-0 rating, the maximum burn time is 10 seconds. For a V-1 or V-2 rating the maximum burn time is 30 seconds[5]

The probability $P_{drip,\ n=0}$ that no specimen exhibits dripping during the flame test is an attribute function, estimated by:

$$(1 - P_{drip})^5$$

where $P_{drip}$=(the number of bars that drip/the number of bars tested).

The probability $P_{total<=mtbt}$ that the sum of the burn times is less than or equal to a maximum total burn time value may be determined from a normal distribution curve of simulated 5-bar total burn times. The distribution may be generated from a Monte Carlo simulation of 1000 sets of five bars using the distribution for the burn time data determined above. Techniques for Monte Carlo simulation are well known in the art. A normal distribution curve for 5-bar total burn times may be generated using the mean and standard deviation of the simulated 1000 sets. Therefore, $P_{total<=mtbt}$ may be determined from the area under a log normal distribution curve of a set of 1000 Monte Carlo simulated 5-bar total burn time for total<=maximum total burn time. For the UL-94 V-0 rating, the maximum total burn time is 50 seconds. For a V1 or V2 rating, the maximum total burn time is 250 seconds.

Preferably, p(FTP) is as close to 1 as possible, for example, greater than or equal to about 0.85, optionally greater than or equal to about 0.9 or, more specifically, greater than or equal to about 0.95, for maximum flame-retardant performance in UL testing. The p(FTP) $\geq$ 0.85 is a more stringent standard than merely specifying compliance with the referenced V0 or V1 test.

The invention is further illustrated by the following non-limiting Examples.

In the examples, the polycarbonates (PC) are based on Bisphenol A, and have a molecular weight of 10,000 to 120,000, more specifically 18,000 to 40,000 (on an absolute molecular weight scale), available from GE Advanced Materials under the trade name LEXAN. The initial melt flow of the polycarbonates was about 6 to about 27 measured at 300° C. using a 1.2 Kg load, per ASTM D1238.

The MBS is Rohm & Haas EXL2691A, EXL2650A, or EXL2602, nominal 75-82 wt. % butadiene core with a balance styrene-methyl methacrylate shell. One method of manufacturing the MBS is in accordance with the process described U.S. Pat. No. 6,545,089.

The bulk ABS (BABS) used was GE Advanced Materials Bulk ABS C29449, which had a nominal 17 wt. % butadiene, with the remainder being styrene and acrylonitrile. The microstructure is phased inverted, with occluded SAN in a butadiene phase in a SAN matrix. The BABS can be manufactured using a plug flow reactor in series with a stirred, boiling reactor as described, for example, in U.S. Pat. No. 3,981,944 and U.S. Pat. No. 5,414,045.

Samples were prepared by melt extrusion on a Toshiba twin screw extruder, using a nominal melt temperature of 255° C. (490° F.), and 350 rpm. The extrudate was pelletized and dried at about 80° C. for about 4 hours To make test specimens, the dried pellets were injection molded on an 85-ton injection molding machine at a nominal temp of 525° C., wherein the barrel temperature of the injection molding machine varied from about 230° C. to about 300° C. Specimens were tested in accordance with ASTM or ISO standards as described above.

The following components were used:

TABLE 1

| Component | Type | Source |
|---|---|---|
| PC-1 | BPA polycarbonate resin made by an interfacial process with an MVR at 300° C./1.2 kg, of 30 g/10 min | GE Advanced Materials |
| PC-2 | BPA polycarbonate resin made by an interfacial process with an MVR at 300° C./1.2 kg, of 6 g/10 min | GE Advanced Materials |
| BABS | Bulk ABS comprising about 17 wt. % polybutadiene (Grade C29449) | GE Advanced Materials |
| MBS-1 | MBS is nominal 75-82 wt. % butadiene core with a balance styrene-methyl methacrylate shell. Trade name EXL-2691A | Rohm & Haas |
| MBS-2 | MBS is nominal 76-80 wt. % butadiene core with a balance styrene-methyl methacrylate shell. Trade name EXL-2650A | Rohm & Haas |
| MBS-3 | MBS is nominal 76-80 wt. % butadiene core with a balance styrene-methyl methacrylate shell. Trade name EXL-2602 | Rohm & Has |
| PC-Si | Polysiloxane-polycarbonate copolymer comprising units derived from BPA and units derived from formula (10), wherein n is 0, $R^2$ is propylene, R is methyl, D has an average value of about 50, the copolymer having an absolute weight average molecular weight of about 30000 g/mol, and a dimethylsiloxane content of about 20 wt. % | GE Advanced Materials |
| BPA-DP | Bisphenol A bis(diphenylphosphate) | Dahaichi Chemical Co. |
| Filler | Talc (HST05) | Hayashi Kasei Co. |

Samples were produced according to the method described above using the materials in Table 1, and testing according to the test methods previously described. The sample formulations and test results are shown in Table 2 below.

TABLE 2

| | | SAMPLE | | | | |
|---|---|---|---|---|---|---|
| | Units | C1 | C2 | 1 | 2 | 3 |
| COMPONENTS | | | | | | |
| PC-1 | % | 35.87 | 36.37 | 35.87 | 35.87 | 35.87 |
| PC-2 | % | 35.87 | 36.37 | 35.87 | 35.87 | 35.87 |
| BABS | % | 13.50 | 11.50 | 11.50 | 11.50 | 11.50 |
| BPADP | % | 13.70 | 13.70 | 13.70 | 13.70 | 13.70 |
| MBS-1 | % | 0 | 0 | 0 | 0 | 2.00 |
| MBS-2 | % | 0 | 0 | 0 | 2.00 | 0 |
| MBS-3 | % | 0 | 1.00 | 2.00 | 0 | 0 |
| Others* | % | 1.06 | 1.06 | 1.06 | 1.06 | 1.06 |
| MBS in total IM Composition Total | % | 0 | 8.0 | 14.8 | 14.8 | 14.8 |
| PHYSICAL PROPERTIES | | | | | | |
| MVR 260° C. 2.16 kg | g/10 min | 20.1 | 21.2 | 20.4 | 20.8 | 20.3 |
| Notched Izod Impact, 23° C. | J/m | 103 | 125 | 666 | 624 | 618 |
| HDT | ° C. | 88.9 | 88.9 | 88.0 | 88.5 | 88.5 |
| pFTP V0, 1.2 mm | | 0.93 | 1.00 | 0.97 | 1.00 | 0.98 |
| Pass/Fail 1.2 mm V0 | | Pass | Pass | Pass | Pass | Pass |

*Stabilization package comprising hindered phenol anti-oxidant (0.08%), phosphite stabilizer (0.08%), pentaerythritol tetrastearate (0.20%) mold release agent, and TSAN (0.70%) as anti-dripping agent.

The above results illustrate that compositions in accordance with the present invention (Examples 1 to 3) having at least 2% MBS replacing BABS along with the BABS exhibit significant improvement in the impact results while maintaining or slightly improving the flame performance.

Additional samples were produced using the materials in Table 1, as well as a filler. The results (in Table 3 below) show that the performance of blends with a portion of the BABS replaced with MBS have improved impact performance compared to the composition with the same amount of polycarbonate-polysiloxane copolymer replacing a portion of the BABS (Comparative Example C3). Comparative Example C3 had poor impact performance, comparable to Comparative Examples C1 and C4, without any MBS in the composition.

TABLE 3

| | | SAMPLE | | | | | | | |
|---|---|---|---|---|---|---|---|---|---|
| | Units | C1 | 4 | 5 | C3 | C4 | C5 | C6 | 6 |
| COMPONENTS | | | | | | | | | |
| PC-1 | % | 35.87 | 35.37 | 34.87 | 34.87 | 36.62 | 35.12 | 35.12 | 34.62 |
| PC-2 | % | 35.87 | 35.37 | 34.87 | 34.87 | 36.62 | 35.12 | 35.12 | 34.62 |
| BABS | % | 13.50 | 11.50 | 11.50 | 11.50 | 11.50 | 11.50 | 11.50 | 11.50 |
| BPADP | % | 13.70 | 13.70 | 13.70 | 13.70 | 13.70 | 13.70 | 13.70 | 13.70 |
| MBS-3 | % | 0 | 2.00 | 2.00 | 0 | 0 | 1.00 | 1.00 | 2.00 |
| Filler | % | 0 | 1.00 | 2.00 | 2.00 | 0 | 2.00 | 2.00 | 2.00 |
| PC-Si | % | 0 | 0 | 0 | 2.00 | 0 | 0 | 0 | 0 |
| Others* | % | 1.06 | 1.06 | 1.06 | 1.06 | 1.56 | 1.56 | 1.56 | 1.56 |
| MBS in total IM Composition Total | % | 0 | 14.8 | 14.8 | 0 | 0 | 8.0 | 8.0 | 14.8 |
| PHYSICAL PROPERTIES | | | | | | | | | |
| MVR 260° C. 2.16 kg | g/10 min | 20.1 | 19.5 | 18.7 | 18.2 | 21.5 | 18.5 | 19.5 | 17.8 |
| Notched Izod Impact, 23° C. | J/m | 103 | 467 | 301 | 103 | 96.2 | 109 | 107 | 393 |
| HDT | ° C. | 88.9 | 88.8 | 89.7 | 89.7 | 88.8 | 89.2 | 88.4 | 89.0 |
| pFTP V0, 1.2 mm | | 0.93 | 0.97 | 1.00 | 1.00 | 0.92 | 1.00 | 1.00 | 1.00 |
| Pass/Fail 1.2 mm V0 | | Pass | Pass | Pass | Pass | Pass | Pass | Pass | Pass |

*Stabilization package comprising hindered phenol anti-oxidant (0.08%), phosphite stabilizer (0.08%), pentaerythritol tetrastearate (0.20%) mold release agent, and TSAN (0.70%) as anti-dripping agent.

Additional samples were prepared using the materials in Table 1. The level of MBS in the total impact modifier composition was varied from 0% to 100% (or from 0% to 13.5% MBS in the total composition) to determine the optimal ratio of MBS to BABS in the formulation. Results are shown in Table 4 below.

TABLE 4

| | | SAMPLE | | | | | | | |
|---|---|---|---|---|---|---|---|---|---|
| | Units | C7 | 7 | 8 | 9 | 10 | C8 | C9 | 11 |
| COMPONENTS | | | | | | | | | |
| PC-1 | % | 35.87 | 35.87 | 35.87 | 35.87 | 35.87 | 35.87 | 35.87 | 35.87 |
| PC-2 | % | 35.87 | 35.87 | 35.87 | 35.87 | 35.87 | 35.87 | 35.87 | 35.87 |
| BABS | % | 13.50 | 11.50 | 9.50 | 6.75 | 4.00 | 2.00 | 0 | 11.50 |
| BPADP | % | 13.70 | 13.70 | 13.70 | 13.70 | 13.70 | 13.70 | 13.70 | 13.70 |
| MBS-2 | % | 0 | 2.00 | 4.00 | 6.75 | 9.50 | 11.50 | 13.50 | 2.00 |
| Others* | % | 1.06 | 1.06 | 1.06 | 1.06 | 1.06 | 1.06 | 1.06 | 1.06 |
| MBS in total IM Composition Total | % | 0 | 14.8 | 29.6 | 50.0 | 70.1 | 85.2 | 100 | 14.8 |
| PHYSICAL PROPERTIES | | | | | | | | | |
| MVR 260° C. 2.16 kg | g/10 min | 22.1 | 21.8 | 19.4 | 17.0 | 13.6 | 11.9 | 9.8 | 21.9 |
| Notched Izod Impact, 23° C. | J/m | 109 | 622 | 721 | 717 | 695 | 669 | 618 | 670 |
| HDT | ° C. | 80.3 | 80.6 | 81.3 | 79.9 | 79.7 | 78.1 | 77.9 | 80.6 |

TABLE 4-continued

| | Units | C7 | 7 | 8 | 9 | 10 | C8 | C9 | 11 |
|---|---|---|---|---|---|---|---|---|---|
| Flexural Modulus | MPa | 2380 | 2320 | 2250 | 2180 | 2110 | 2050 | 1990 | 2310 |
| Ductility | % | 0 | 100 | 100 | 100 | 100 | 100 | 100 | 100 |
| pFTP V0, 1.2 mm | | 1 | 1 | 1 | 1 | 0.99 | 0.30 | 0.33 | 1 |
| Pass/Fail 1.2 mm V0 | | Pass | Pass | Pass | Pass | Pass | Fail | Fail | Pass |

*Stabilization package comprising hindered phenol anti-oxidant (0.08%), phosphite stabilizer (0.08%), pentaerythritol tetrastearate (0.20%) mold release agent, and TSAN (0.70%) as anti-dripping agent.

Table 4 shows that when the impact modifier composition comprises a blend of a Bulk ABS and an impact modifier other than BABS, such as MBS, the balance of properties is improved. When the amount of the second impact modifier is from about 2.00% by weight to about 9.50% by weight of the total composition (at least about 14% by weight of the total impact modifier composition), the balance of properties is maintained. For samples where component b) is from about 2 to about 6.75 wt. % by weight of the second impact modifier in the total composition (from about 14 wt. % to about 50 wt. % of the impact modifier composition), the balance of all properties is good. When component b) is about 9.50% by weight of the second impact modifier (about 70 wt. % of the total impact modifier composition), the properties are still very good, particularly flame performance and impact, although the flow is not as good as at lower amounts of the second impact modifier. If too much or too little of the second impact modifier is used, then performance is not as good. Flame performance (measured and reported as pFTP and Pass/Fail), both deteriorate when too much MBS is used. When too little MBS is used, or no MBS is used, ductility and impact suffer. Therefore, only specific combinations will provide the desired balance of physical properties as well as the desired flame performance.

As used herein, the terms "first," "second," and the like do not denote any order or importance, but rather are used to distinguish one element from another, and the terms "the", "a" and "an" do not denote a limitation of quantity, but rather denote the presence of at least one of the referenced item. All ranges disclosed herein for the same properties or amounts are inclusive of the endpoints, and each of the endpoints is independently combinable. All cited patents, patent applications, and other references are incorporated herein by reference in their entirety.

The modifier "about" used in connection with a quantity is inclusive of the stated value and has the meaning dictated by the context (e.g., includes the degree of error associated with measurement of the particular quantity).

"Optional" or "optionally" means that the subsequently described event or circumstance may or may not occur, and that the description includes instances where the event occurs and instances where it does not.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A thermoplastic composition comprising in combination
    a polycarbonate component;
    an impact modifier composition, the components comprising
        a) a bulk polymerized ABS;
        b) an impact modifier different from the ABS; and
    a flame retardant,
wherein b) comprises an elastomeric phase comprising a butadiene rubber, an ethylene-propylene-diene monomer rubber, an elastomeric copolymer of a $C_{1-8}$ alkyl (meth)acrylate with butadiene, or a combination comprising at least one of the foregoing elastomers, together with a rigid copolymer phase derived from the copolymerization of a monomer of formula (9):

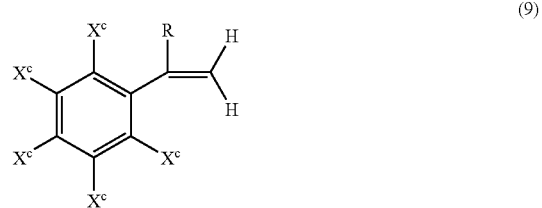

(9)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro, with a monomer of the generic formula (10):

(10)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, or hydroxycarbonyl,
wherein the composition is capable of achieving a UL94 rating of V0 at a thickness of 1.5 mm, and wherein the composition has a notched Izod Impact of greater than about 300 J/m, determined at 23° C. using a one-eighth inch (3.2 mm) thick bar per ASTM D256.

2. The thermoplastic composition of claim 1, wherein the elastomer phase comprises polybutadiene and the rigid copolymer phase comprises units derived from the copolymerization of styrene, alpha-methyl styrene, dibromostyrene, vinyltoluene, vinylxylene, butylstyrene, para-hydroxystyrene, methoxystyrene, or a combination comprising at least one of the foregoing styrenes with acrylonitrile, ethacrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, or a combination comprising at least one of the foregoing comonomers.

3. The composition of claim 2 wherein the impact modifier other than bulk polymerized ABS is MBS, MABS or a combination comprising at least one of the foregoing impact modifiers.

4. The thermoplastic composition of claim 1, further comprising a filler.

5. The thermoplastic composition of claim 1, comprising about 50 to about 90 wt. % polycarbonate component, about 3 to about 35 wt % of an impact modifier composition comprising about 3 to about 25 wt. % of component a) and about 0.5 to about 10 wt. % of component b), and about 2 to about 25 wt. % flame retardant.

6. The thermoplastic composition of claim 5, wherein component b) comprises from about 10 wt. % to about 50 wt. % of the impact modifier composition.

7. The thermoplastic composition of claim 6, wherein component b) comprises from about 14 wt. % to about 30 wt. % of the impact modifier composition.

8. The thermoplastic composition of claim 1, wherein the composition is capable of achieving a UL94 rating of V0 at a thickness of 1.2 mm.

9. An article comprising the thermoplastic composition of claim 1.

10. A method of manufacture of an article comprising molding, extruding, or shaping the composition of claim 1.

11. A thermoplastic composition comprising in combination from about 60 wt. % to about 80 wt. % a polycarbonate component;
an impact modifier composition, the components comprising
a) from about 5 wt. % to about 20 wt. % of a bulk polymerized ABS;
b) from about 1 wt. % to about 10 wt. % of an impact modifier different from the ABS, based on the total weight of the thermoplastic composition; and
from about 5 wt. % to about 20 wt. % a flame retardant,
wherein b) comprises an elastomeric phase comprising a butadiene rubber, an ethylene-propylene-diene monomer rubber, an elastomeric copolymer of a $C_{1-8}$ alkyl (meth)acrylate with butadiene or a combination comprising at least one of the foregoing elastomers, together with a rigid copolymer phase derived from the copolymerization of a monomer of formula (9):

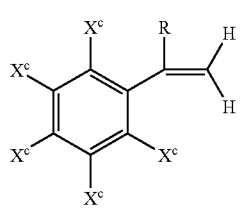

(9)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro, with a monomer of the generic formula (10):

(10)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, or hydroxycarbonyl,
wherein the composition is capable of achieving a UL94 rating of V0 at a thickness of 1.5 mm, and wherein the composition has a notched Izod Impact of greater than about 300 J/m, determined at 23° C. using a one-eighth inch (3.2 mm) thick bar per ASTM D256.

12. The thermoplastic composition of claim 11, wherein the elastomer-modified impact modifier different from bulk polymerized ABS comprises at least about 2 wt. % of the total composition.

13. The thermoplastic composition of claim 11, wherein the elastomer-modified impact modifier different from bulk polymerized ABS comprises from about 2 wt. % to about 10 wt. % of the total composition.

14. The thermoplastic composition of claim 11, further comprising a filler.

15. The thermoplastic composition of claim 11, wherein composition is capable of achieving a UL94 rating of V0 at a thickness of 1.2 mm.

16. A thermoplastic composition comprising in combination
from about 60 wt. % to about 80 wt. % a polycarbonate component;
from about 3 to about 35 wt. % of an impact modifier composition, the components comprising
a) a bulk polymerized ABS;
b) MBS,
wherein b) comprises from about 10 wt. % to about 50 wt. % of the impact modifier composition; and
from about 5 wt. % to about 20 wt. % a flame retardant,
wherein the composition is capable of achieving a UL94 rating of V0 at a thickness of 1.5 mm, and wherein the composition has a notched Izod Impact of greater than about 300 J/m, determined at 23° C. using a one-eighth inch (3.2 mm) thick bar per ASTM D256.

17. The thermoplastic composition of claim 16, wherein the flame retardant is a phosphorous-containing flame retardant.

18. The thermoplastic composition of claim 16, wherein composition is capable of achieving a UL94 rating of V0 at a thickness of 1.2 mm.

19. The thermoplastic composition of claim 16, wherein component b) comprises from about 14 wt. % to about 30 wt. % of the impact modifier composition.

20. An article comprising the thermoplastic composition of claim 16.

21. A thermoplastic composition comprising in combination
a polycarbonate component;
an impact modifier composition, the components comprising a) a bulk polymerized ABS;

b) an impact modifier different from the ABS, wherein b) comprises an elastomeric phase comprising a butadiene rubber, an ethylene-propylene-diene monomer rubber, an elastomeric copolymer of a $C_{1-8}$ alkyl (meth)acrylate with butadiene or a combination comprising at least one of the foregoing elastomers, together with a rigid copolymer phase derived from the copolymerization of a monomer of formula (9):

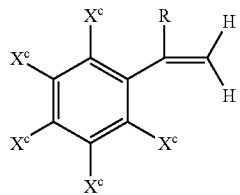

(9)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro, with a monomer of the generic formula (10):

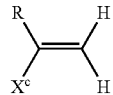

(10)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, or hydroxycarbonyl; and a flame retardant, wherein the thermoplastic has a notched Izod impact strength of greater than about 600 J/m, determined at 23° C. using a 3.2 mm thick bar per ASTM D256 and wherein composition is capable of achieving a UL94 rating of V0 at a thickness of less than or equal to 1.5 mm.

22. The thermoplastic composition of claim 21, wherein composition is capable of achieving a UL94 rating of V0 at a thickness of 1.2 mm.

* * * * *